Patented Apr. 9, 1929.

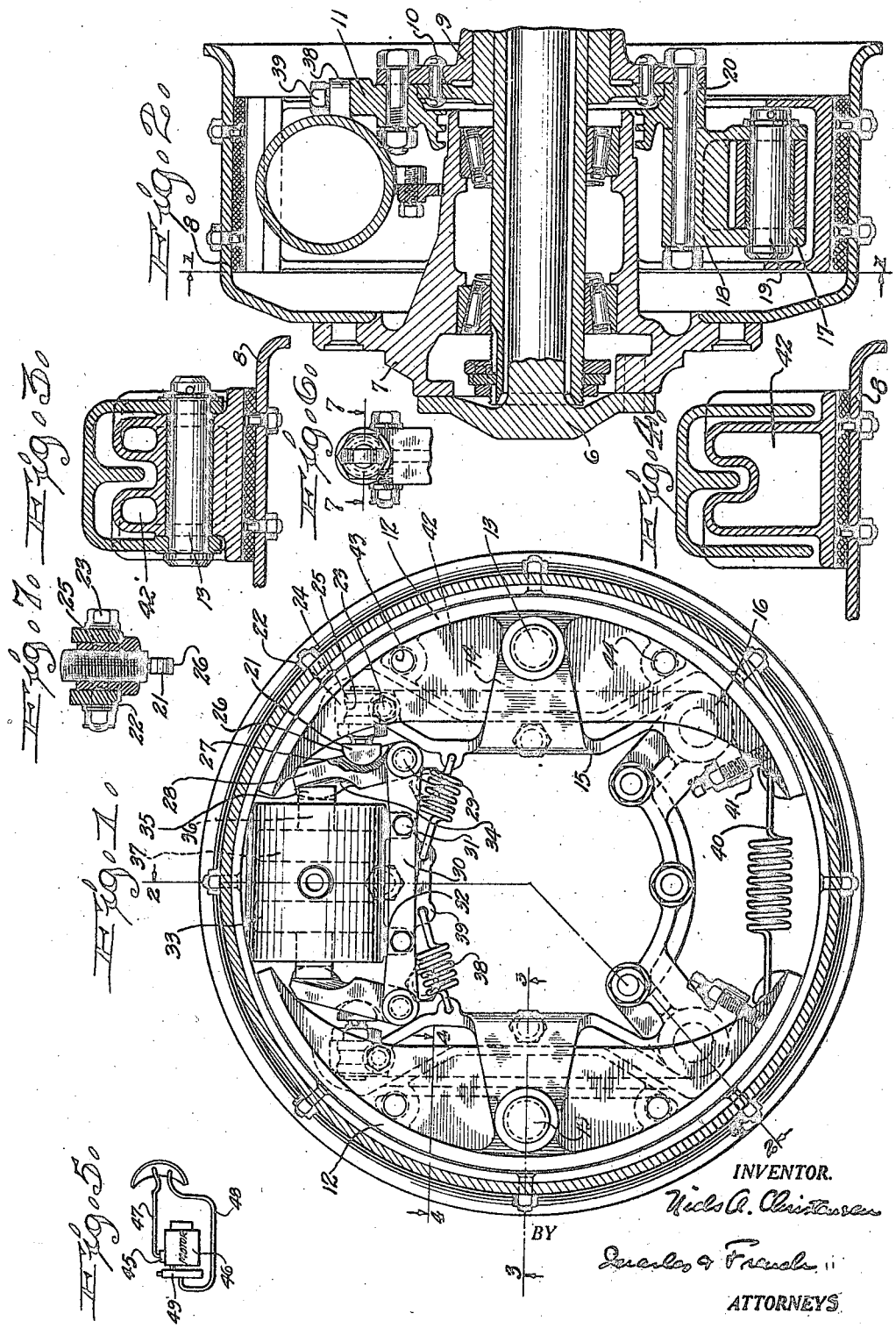

1,707,973

UNITED STATES PATENT OFFICE.

NIELS A. CHRISTENSEN, OF CLEVELAND, OHIO.

VEHICLE BRAKE APPARATUS.

Application filed February 8, 1926. Serial No. 86,847.

The invention relates to brake apparatus for automotive vehicles.

One of the objects of the invention is to provide a brake construction in which the brake shoes may be applied through a system of multiplying levers and thus permit of the efficient use of all-metal brake shoes.

In the operation of brakes on large vehicles traveling over steep grades, it has been found that the brake shoes or the drum become highly heated, and to provide against this another object of the invention is to provide a water-cooled brake shoe which preferably receives its supply of cooling fluid by connection with the cooling system of the propelling motor of the vehicle whereby the brake surfaces are cooled and an efficient circulation of the cooling fluid is assured without the addition of a separate pump.

The invention further consists in the several features hereinafter set forth and more particularly defined by claims at the conclusion hereof.

In the drawings, Fig. 1 is a vertical sectional view through a brake mechanism embodying the invention;

Fig. 2 is a sectional view taken on the broken line 2—2 of Fig. 1;

Fig. 3 is a detail sectional view taken on the line 3—3 of Fig. 1;

Fig. 4 is a detail sectional view taken on the line 4—4 of Fig. 1;

Fig. 5 is a diagrammatic view of the brake-cooling system;

Fig. 6 is a detail view of an adjustable thrust connection;

Fig. 7 is a detail sectional view taken on line 7—7 of Fig. 6.

In the drawings the numeral 6 designates a wheel axle, 7 the hub of a wheel mounted on the axle, 8 a brake drum secured to said hub, and 9, 10 and 11 parts forming a brake support, parts 9 and 10 as here shown being parts of a rear axle housing.

Brake shoes 12, preferably of the all-metal brake face type, are mounted intermediate their ends on pins 13, and in each instance the pins are carried in the spaced arms 14 of a lever member 15 which is pivotally mounted at its lower end 16 between the arms 17 of a brake-supporting bracket 18 and upon a pin 19 extending through said arms 17 and held therein against longitudinal displacement. The bracket 18 is secured by bolts 20 to the members 9 and 11.

A jack-screw 21 is adjustably secured in the free end of each lever member 15 by providing a split bushing portion 22 on said end of said lever and a bolt 23 for tightening said bushing about a sleeve-nut 24 in which the threaded shank of said screw is mounted, the sleeve portion of said nut being held against longitudinal movement by providing an annular groove 25 therein into which the shank of the bolt 23 extends. The head 26 of the jack-screw is flattened to form a T-shaped member and this permits the jack-screw to be turned relative to the sleeve nut 24 to the desired adjusted position and to bring the plane of the head of the screw into the plane of a groove or slot 27 in a lever 28.

Each lever 28 is pivotally mounted on a pin 29 carried in a frame member or bracket 30 secured by bolts 31 to lugs 32 projecting from the brake cylinder 33. The outer end of the lever 28 is provided with a tongue 34 in which a slotted head 35, formed on a piston-rod 36, engages.

The piston-rod 36 is connected to a suitably packed piston 37, and each of the pistons 37 works in the brake cylinder 33 which has a lug 38 secured by bolts 39 to the part 11 of the brake support. The slotted connections between the piston-rod and the lever 28 and said lever and the jack-screw permits these parts to be kept in alinement so that the levers 15 will swing at the pins 19 without side-thrust on its pivot.

The pressure fluid is admitted between the pistons of the fluid-pressure-operated motor through a connection (not shown) with the supply system, and when so admitted forces the pistons 37 outwardly, thereby swinging the levers 28 outwardly, these levers in turn swinging the levers 15 outwardly so that the brake shoes 12 connected to said levers 15 are moved outwardly into braking engagement with the drum. The point of application of the force of the lever upon the jack-screw 21 may be one-half the distance from the fulcrum of said lever to the point of application of the piston of the motor, and the distance between the pivot pins 13 and 16 may be one-half the distance between the pivot pins 16 and the outer end of the lever 15, with the result that a four-to one lever system may be provided, so that the pressure of the shoes is multiplied four times over the pressure acting upon the pistons, with the result that an efficient brake connection is had between the metal parts of the shoe and the drum.

Upon release of pressure from the brake cylinder the levers are moved to a release position, by means of springs 38, each secured at one end to one of the levers 15 and at the other end to lugs 39 on the brake member 30.

The shoes 12 are held in a release position by means of a spring 40 connected at its ends to adjacent ends of the shoes, the release position of the shoes being determined by adjustable set-screws 41 carried on the levers 15, said screws acting as stops to limit the swinging movement of the shoes relative to the levers 15 whereby the inner swinging movement of said levers 15 releases the shoes from the drum.

In order to efficiently cool the shoes and the brake drum, each of the shoes is provided with a jacket space 42 which, as will be noted in Fig. 3, has separated portions 42' in order to take care of the pivot pin 13. An inlet pipe connection 43 is provided at one end of the jacket and an outlet pipe connection 44 at the other end of the jacket, including flexible pipe connections to the points 43 and 44. The cooling fluid is circulated through the brake shoes, hence cooling same and consequently, through conduction, cools the drum when frictional heat is generated during the braking application.

In order to simplify the cooling of the shoes, I have shown, in Fig. 5, a circulating system associated with the cooling system of the propelling motor, wherein 45 designates the circulating pump associated with the engine 46, 47 a pipe leading from the circulating system to one of the shoes, and 48 a return pipe leading from the shoe to the radiator 49. Thus, the cooling fluid used in the engine is at the same time circulated by the circulating pump of the engine cooling system and used to cool the brake.

I desire it to be understood that this invention is not to be limited to any specific form or arrangement or parts except in so far as such limitations are specified in the claims.

What I claim as my invention is:

1. In a vehicle brake, the combination of a rotatable brake drum, a brake support, a fluid-pressure-operated motor mounted on said support and having a piston-rod, a lever having its free end engaged directly by said rod, a brake-shoe-carrying lever having its free end in direct thrust connection with an intermediate portion of said first-named lever, a brake shoe medially pivotally mounted upon said carrying lever and engageable with said drum, and means to move the shoe and levers to a release position.

2. In a vehicle brake, the combination of a rotatable brake drum, a brake support, a fluid-pressure-operated motor mounted on said support and having a piston-rod, a lever having its free end engaged directly by said rod, a brake-shoe-carrying lever having its free end in direct thrust connection with an intermediate portion of said first-named lever, a brake shoe medially pivotally mounted upon said carrying lever and engageable with said drum, adjustable means between the carrying lever and the brake shoe determining its release position, and means to move the shoe and levers to a release position.

3. In a vehicle brake, the combination of a rotatable drum, a brake support, a fluid-pressure-operated motor mounted on said support and having a piston rod, a pivoted lever engaged directly by said rod, a brake-carrying lever having an adjustable direct thrust connection with said first-named lever, a brake member associated with the drum and pivotally mounted on said brake-carrying lever, and means for releasing said brake member from the drum.

4. In a vehicle brake, the combination of a rotatable drum, a brake support, a fluid-pressure-operated motor mounted on said support and having a thrust rod, a pivoted lever having its free end in thrust engagement with said rod, a lever pivotally mounted at one end portion upon said support and having its free end in thrust engagement with an intermediate portion of said first-named lever, a brake member associated with said drum and medially pivotally supported on said second-named lever, and means for releasing said brake member from said drum.

5. In a vehicle brake, the combination of a rotatable drum, a brake support, a fluid-pressure-operated motor mounted on said support and having a thrust rod, a pivoted lever having its free end in thrust engagement with said rod, a lever pivotally mounted at one end portion upon said support and having its free end in thrust engagement with an intermediate portion of said first-named lever, a brake member associated with said drum and medially pivotally supported on said second-named lever, adjustable stop means between the pivoted end of said second-named lever and said brake to limit its release position, and means for releasing said brake member from said drum.

In testimony whereof, I affix my signature.

NIELS A. CHRISTENSEN.